(12) United States Patent
Schmidt et al.

(10) Patent No.: US 7,406,120 B1
(45) Date of Patent: Jul. 29, 2008

(54) TRANSMISSION CHANNEL IMPULSE RESPONSE ESTIMATION USING FAST ALGORITHMS

(75) Inventors: Barnet M. Schmidt, Oradell, NJ (US); Gary Lomp, Centerport, NY (US); Charles R. Giardina, Mahwah, NJ (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 574 days.

(21) Appl. No.: 11/096,418

(22) Filed: Apr. 1, 2005

(51) Int. Cl.
*H03H 7/30* (2006.01)
(52) U.S. Cl. .................. 375/229; 375/140; 375/142; 375/233; 375/267; 380/239; 455/562.1; 370/335
(58) Field of Classification Search ............ 375/142, 375/267, 233, 229, 140; 380/239; 455/562.1; 370/335; 714/785
See application file for complete search history.

(56) References Cited

U.S. PATENT DOCUMENTS 4,484,027 A * 11/1984 Lee et al. .................. 380/239

| 2003/0095586 | A1* | 5/2003 | Geers | 375/142 |
| 2004/0228420 | A1* | 11/2004 | Chul | 375/267 |
| 2005/0254570 | A1* | 11/2005 | Amizic et al. | 375/233 |
| 2006/0040706 | A1* | 2/2006 | Wu et al. | 455/562.1 |
| 2006/0146759 | A1* | 7/2006 | Guo et al. | 370/335 |

* cited by examiner

*Primary Examiner*—Chieh M. Fan
*Assistant Examiner*—Sudhanshu C. Pathak
(74) *Attorney, Agent, or Firm*—Kenneth P. Robinson

(57) ABSTRACT

Channel impulse response estimation employs a training sequence to enable correction for multipath and other disturbances affecting a signal during transmission via a digital wireless communication channel. High-speed packet transmission rates, with a training sequence for each packet, are made possible by training sequence construction enabling fast algorithm processing of received signals for impulse response estimation. Upon reception, a Toeplitz-type mathematical representation is constructed based on transmitted and received versions of a training sequence. The Toeplitz-type representation may then be processed by application of fast algorithms, such as Levinson-type algorithms, to determine coefficients representative of the communication channel impulse response. These coefficients, applied to an adaptive equalizer type of filter, enable correction for signal disturbances incurred in transmission. Channel impulse response estimation methods and systems are described.

32 Claims, 3 Drawing Sheets

TRANSMISSION CHANNEL IMPULSE RESPONSE ESTIMATION USING FAST ALGORITHMS

RELATED APPLICATIONS (Not Applicable)

FEDERALLY SPONSORED RESEARCH (Not Applicable)

BACKGROUND OF THE INVENTION

This invention relates to digital wireless communications systems and, more particularly, to transmission channels subject to disturbances such as frequency-selective fading and multipath effects.

In high data throughput wireless digital communication systems, the maximum data transmission rate may be limited by disturbances in the wireless propagation path (i.e., the communication channel). These effects include disturbances such as frequency-selective fading and multipath (copies of the transmitted signal delayed in time to the receiver due to reflections from objects and atmospheric phenomena between the transmitter and the receiver). These disturbances may result in interference between the digitally-modulated symbols representing the information bits to be transmitted, thus impairing the receiver's demodulator from correctly decoding the received symbols to arrive at accurate bit decisions. This "intersymbol interference" may cause the received symbols to overlap the decision boundaries in the complex signal space to adjacent symbols and result in either bit decision errors or lowered bit decision confidence. Systems subject to these effects may thus be required to operate at lower data throughput rates or higher error rates than would otherwise be attainable.

A traditional solution to such channel disturbance problems is to provide an adaptive equalizer consisting of a digital filter whose coefficients can be adjusted to model the inverse of the actual channel impulse response. The resulting digital filter thus enables compensation for the effects of channel nonlinearity by providing this reciprocal of the actual channel impulse response (e.g., a polarity-inverted representation of the channel transmission characteristics as degraded by whatever such disturbances are actually present at a particular time). The determination of the channel impulse response is typically performed by transmitting a test pattern (i.e., a training sequence) to excite the channel at all frequencies, or all frequencies of significant interest, within the data bandwidth of interest and measuring the resulting effect on the training sequence waveform upon transmission through the channel. The calculation of filter coefficients to model the channel impulse response based upon this measurement may typically be done using an estimation process such as a Mean Square Error algorithm.

In digital transmission systems operating at high data rates (such as military communications systems or for commercial wireless Internet access), the channel impulse response estimation time (i.e., the time required to provide such filter coefficients) becomes a critical factor. Since the disturbance effects may be constantly changing, the impulse response estimate must be updated frequently to accommodate high data rates. As a result, the time required to calculate the channel impulse response may become an important factor limiting the maximum data rate of the system. Established techniques and methods for calculating the channel impulse response have typically been subject to constraints on speed, accuracy or other relevant factors.

Objects of the present invention are, therefore, to provide channel impulse response estimation methods and systems which are new or improved and which may provide one or more of the following capabilities or characteristics:

improved capability to estimate channel impulse response;

rapid estimation of channel impulse response;

channel impulse response estimation repetition on per packet basis;

provision of an improved form of training sequence;

provision of a training sequence enabling formulation of a Toeplitz-type mathematical system or matrix at a receiver;

construction of a Toeplitz-type matrix representation usable to determine coefficients representative of a channel impulse response; and use of fast algorithms, such as Levinson algorithms, to determine coefficients representative of a channel impulse response.

SUMMARY OF THE INVENTION

In accordance with one aspect of the invention, a method of channel impulse response estimation, usable with a digital wireless communication channel, may include the steps of:

(a) providing a first pseudonoise (PN) sequence for a first packet;

(b) with use of the first PN sequence, providing a first training sequence;

(c) transmitting the first training sequence via the communication channel via a first packet including first data;

(d) receiving the first packet and the first training sequence as transmitted via the communication channel;

(e) forming a Toeplitz-type representation by use of a replica of the first training sequence as provided in step (b) and use of the first training sequence as received in step (d);

(f) processing the Toeplitz-type representation to determine coefficients representative of the channel impulse response of the communication channel; and (g) using those coefficients in processing of the data as included in the first packet.

In accordance with a further aspect of the invention, a channel impulse response estimation system, usable with a digital wireless communication channel, may include the following utilities, which may be implemented via hardware, firmware, software or otherwise, using shared or other configurations thereof individually or in combination. A first utility is configured to provide a pseudonoise (PN) sequence. A second utility is configured to provide a training sequence with use of that PN sequence. A third utility is provided to transmit the training sequence via the communication channel.

In accordance with an additional aspect of the invention, a channel impulse response estimation system, usable with a digital wireless communication channel, may include the following. A utility is configured to receive a first packet transmitted via the communication channel and provide a received version of a first training sequence associated with the first packet. A utility is configured to replicate an original version of the first training sequence as associated with the first packet prior to transmission via the communication channel. A utility is configured to construct a Toeplitz-type representation by use of the received and original versions of the first training sequence. A utility is configured to process the Toeplitz-type representation to determine coefficients representative of the channel impulse response of the communication channel. A utility is configured to use those coefficients to process data included in the first packet.

For a better understanding of the invention, together with other and further objects, reference is made to the accompanying drawings and the scope of the invention will be pointed out in the accompanying claims.

DESCRIPTION OF THE INVENTION

Figure 1:
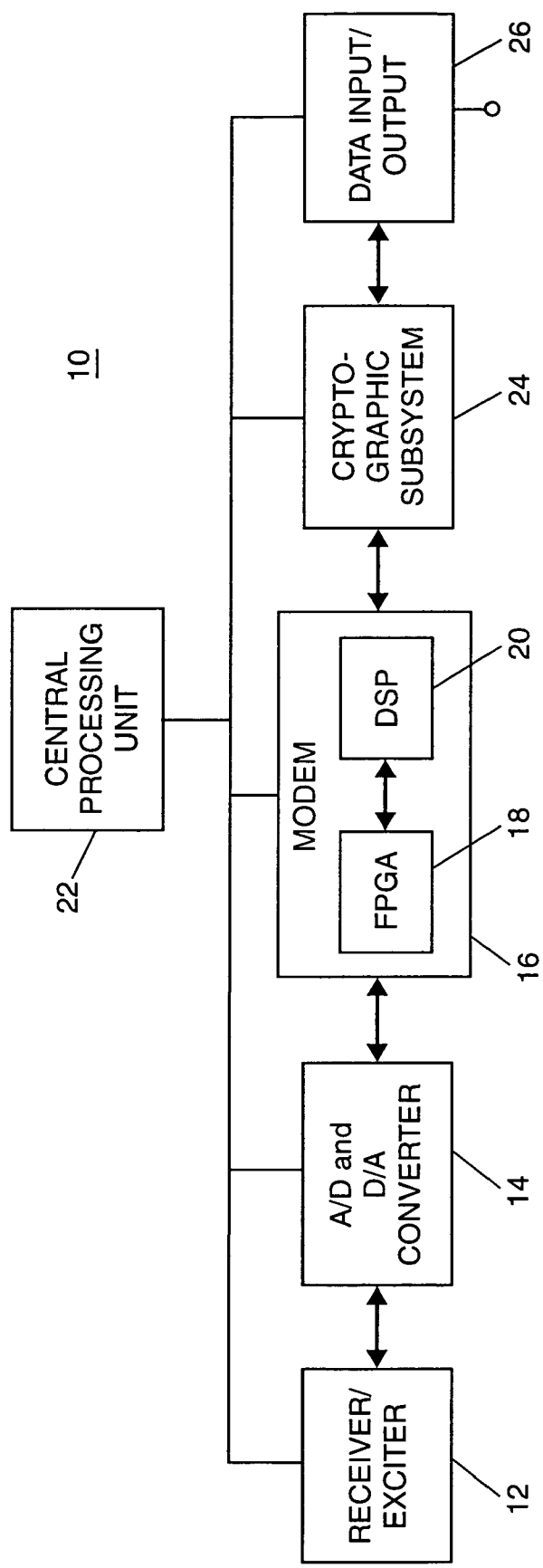
FIG. 1 is a block diagram of a radio, implemented primarily in software, and arranged to transmit or receive packets, each including a training sequence and upon reception to derive channel impulse response characteristics by use of fast algorithms, such as Levinson algorithms.

FIG. 1 shows what may be termed a software-defined digital radio, which is configured to provide one form of implementation of the invention. Radio 10 is arranged to provide both transmission and reception capabilities, so that signal transmission via a communication channel may be provided by use of one radio at the transmit end and another at the receive end. As illustrated, radio 10 of FIG. 1 includes the following basic components.

Receiver/exciter unit 12. Unit 12 includes a receiver which may comprise the following: tuned RF section, frequency synthesizer (for generating the local oscillator signal for tuning the receiver and the driving signal for the exciter generating the transmit RF signal), intermediate frequency (IF) amplifier for increasing the power and signal-to-noise (S/N) ratio of the received signal, and mixers for down-converting the received RF signal to the (lower) intermediate frequency. In many implementations, the receiver and exciter may be combined, however, separate units may be employed. Unit 12 also includes an exciter arranged to generate a radio frequency (RF) carrier for signal transmission.

A/D and D/A converter unit 14. Unit 14 may include analog-to-digital (A/D) and digital-to-analog (D/A) converters, for respectively converting between the digital signals and an outgoing radio frequency (RF) signal for transmission, and between analog signals received by the radio via the receiver and digital signals for further processing.

Modem unit 16. As illustrated, unit 16 includes at least one field-programmable gate array (FPGA) 18 and at least one digital signal processor (DSP) 20.

Central processing unit (CPU) 22. CPU 22 may include control microprocessors, memory, mass storage, and interface devices enabling communications with and between other components of the radio.

Cryptographic subsystem (CSS) unit 24. Unit 24 may be arranged to provide encryption and decryption of data and to provide pseudonoise (PN) sequences used for construction of training sequences.

Input/output (I/O) unit 26. Unit 26 may include circuitry and software suitable for inputting of user data to be transmitted and outputting of data that is received for use by a user of the radio.

In addition to providing basic receive and transmit capabilities the digital radio 10 of FIG. 1 comprises a channel impulse estimation system usable with a packet-based digital wireless communication channel. As will be described, the FIG. 1 system is arranged to provide a unique form of training sequence which is transmitted via a packet also including user data. Upon reception of the packet, the training signal properties enable processing to form a Toeplitz-type representation from which coefficients representative of the channel impulse response can be determined by use of fast algorithms, such as Levinson-type algorithms. by enabling use of fast algorithms (e.g., fast Fourier transforms) channel impulse response coefficients may be determined faster and with reduced volume of signal processing, as compared to typical prior techniques.

Sequence of Operations

An exemplary sequence of operations of the FIG. 1 receiver, including the channel impulse response estimation system, will be described first, with formation of a training sequence and signal processing described in greater detail below.

Figure 2:
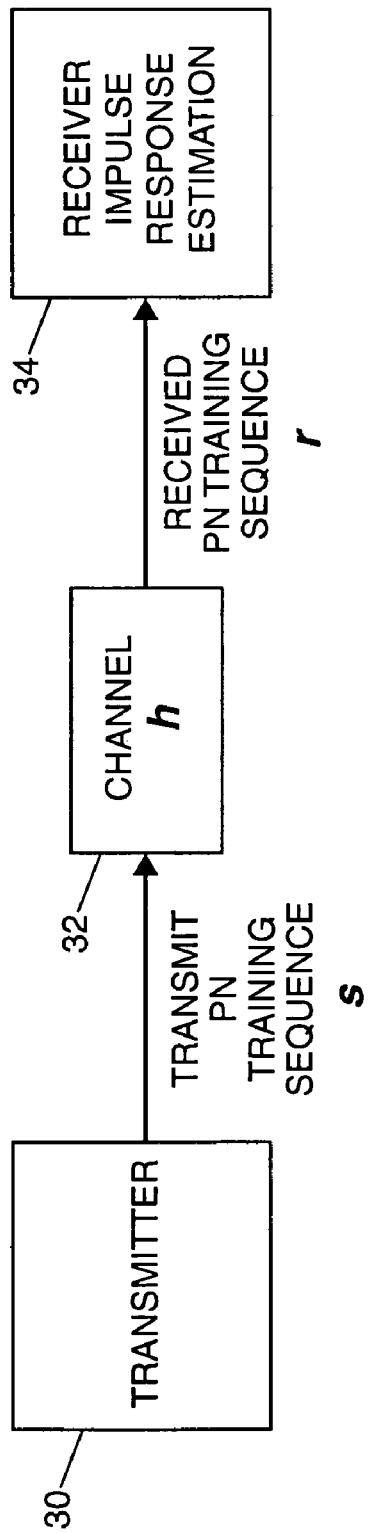
FIG. 2 is a block diagram useful in describing signal flow for channel impulse response estimation.

As an overview, the FIG. 1 receiver 10 is configured to function in a transmit mode whereby a packet, including user data and a training sequence provided for that packet, is transmitted via a communication channel. The receiver 10 is configured to also function in a receive mode to receive the transmitted packet and recover and output the user data. While termed a "receiver", system 10 of FIG. 1 is actually a receiver/transmitter and a communication system may, as noted, include a first receiver at the transmit end and a second receiver at the receive end of a communication channel, as shown in FIG. 2. A representation of signal flow from a transmitter 30, via a communication channel 32, to a receiver 34, which implements impulse response estimation, is provided in FIG. 2. Each of units 30 and 34 of FIG. 2 may have the form of receiver 10 as described with reference to FIG. 1. Signals referenced in FIG. 2 will be described further below.

As shown in the FIG. 1 embodiment, cryptographic subsystem 24 comprises a first utility, which is configured to provide a pseudonoise (PN) sequence, and DSP 20 comprises a second utility, which is configured to provide a training sequence with use of that PN sequence. To assemble a data packet, the DSP 20 constructs a training sequence based upon pseudorandom numbers contained in a Transmission Security (TRANSEC) keystream supplied to the DSP by the cryptographic subsystem 24. The TRANSEC keystream is a pseudonoise (PN) sequence of pseudorandom numbers supplied to the remainder of the software-defined radio by the cryptographic subsystem. The PN sequence may be provided as a known form of a binary sequence with a transorthogonal auto-correlation property, such as has been used for synchronization and communication applications. The TRANSEC keystream is used by the radio to select carrier frequencies for frequency hopping, spreading codes for spectrum-spreading, and to provide pseudonoise (PN) covering of transmitted data. These features improve the security of the wireless communications system by making the transmitted signal difficult to detect (low probability of interception/low probability of detection). Spectrum spreading by direct-sequence encoding and frequency hopping driven by the pseudorandom keystream also improves the resistance to interference or jamming (antijam characteristics).

The DSP 20 assembles the training sequence as will be described in greater detail below and in this example appends the training sequence to the remainder of the transmitted packet, which may contain a synchronization preamble and one or more words of user data. A form of packet structure is illustrated in FIG. 3.

Packets are delineated by a synchronization preamble, which is the first word of the packet. The synchronization preamble contains an orthogonal code generated from the TRANSEC keystream. When the signal is received, the receiver compares the incoming synchronization preamble with a template that it derives from the TRANSEC keystream (which matches the PN sequence utilized by the transmitter to generate the synchronization preamble). A correlator or maximum-likelihood detector is used for this comparison. If the cross-correlation between the incoming synchronization preamble and the locally-generated template exceeds a specified threshold, the receiver identifies the start of the packet and begins to assemble the remainder of the data into a received packet. This process is referred to as declaration of synchronization and is also effective to enable the receiver to generate a replica of the training sequence included in a particular packet when transmitted.

After assembling the training sequence and the user data words into the packet, the DSP 20 sends the packet to the FPGA 18. The FPGA performs forward-error correction (FEC) coding of the packet data bits into symbols for transmission, modulation, phase and time tracking, and other functions required for transmitting packet via the over-the-air interface, which may be provided using known techniques. The FPGA 18 then outputs the coded and modulated symbols to the digital-to-analog (D/A) converter in unit 14. The D/A converter transforms the digital symbols into analog signals represented by continuously-varying voltage levels. This is done separately for the real or inphase (I) and imaginary or quadrature (Q) transmit symbols, thus, there are two D/A converter sections, one for I and one for Q. The D/A converter supplies the analog signals to the exciter in unit 12, which shifts the frequency of the signals from the intermediate frequency (IF) to the transmit carrier frequency. The low-level carrier is then amplified by a radio-frequency (RF) power amplifier which may be included in unit 12 and applied to an antenna (not shown) for transmission.

Figure 3:
FIG. 3 illustrates a packet structure with inclusion of a training sequence.

Receiver/exciter 12 thus comprises a third utility configured to transmit the training sequence (as may be included in a packet as illustrated in FIG. 3) via a wireless communication channel. The term "utility" is used consistent with its dictionary definition to indicate a useful device or configuration and may be implemented via hardware, firmware, software or otherwise, suing shard or other arrangements thereof individually or in combination.

In this example, incoming signals are received at the receiving antenna (not shown) after transmission via the communication channel and received low-level RF signals are fed to a utility configured to receive a transmitted packet, shown as comprising a receiver (e.g., in receiver unit 12 at the receive end of the channel). The receiver utility in unit 12 may include an RF amplifier, tuning and filtering circuitry, mixer, IF amplifier, and analog-to-digital (A/D) converter. The RF amplifier increases the power level of the incoming antenna signal to a useful level. The tuner may consist of a frequency synthesizer and mixer. Depending upon the instantaneous receive frequency in the pseudorandom frequency-hopping pattern (as determined by the TRANSEC keystream), the receiver selects the appropriate local oscillator (LO) frequency by means of a tuning command to the frequency synthesizer. The output LO frequency from the synthesizer is applied to a mixer along with the amplified and preselected (that is, pretuned) incoming RF signal. The mixer performs an algebraic multiplication of the LO and RF signals, thus yielding sum and difference frequency products of the two signals. The LO frequency may be chosen such that the output of the mixer (the sum and difference frequency products) is always constant. This constant frequency is referred to as the intermediate frequency (IF). The IF signal is applied to a narrowly-tuned bandpass amplifier, referred to as the IF amplifier. The IF amplifier, tuned to a small bandwidth and possessing high gain at the IF frequency, greatly increases the power of the IF signal. Since the bandwidth is small, most of the receiver's selectivity (that is, the ability to tune only to the frequency of interest and rejecting signals of frequency outside the bandwidth of interest) is contributed by the IF amplifier. The output of the IF amplifier is then converted from analog composite form (that is, containing both in-phase (I) and quadrature (Q) components) to digital I and Q data by the A/D converter. The digital signals are then sent from the A/D converter of unit 14 to the FPGA 18 of the modem 16.

The FPGA 18 may contain an adaptive equalizer filter (not shown) which may be in the form of a digital finite impulse response (FIR) filter having 128 taps and be of a known type of construction. Each tap implements a unit delay of one sample period. In an exemplary implementation of the invention, the sampling frequency for I and Q each may be 75 MHz, thus yielding a sampling period of 13.3 nanoseconds. Each tap may also contain a multiplier and adder, to produce the product of the signal value and the real or imaginary portion of the impulse response coefficients that are calculated via a method of the invention. Finally, the output of each tap (the aforementioned product) is summed to the outputs of all the other taps by a 128 input adder. The output of the adder is the incoming receive signal equalized using the estimated channel impulse response. The FPGA may also provide demodulator, decoder, and deinterleaver functions specific to the type of modulation, coding, and interleaving used in the particular implementation. It should be noted that the impulse response estimation system may be independent of the modulation, coding, interleaving, and the other specifics of the particular wireless communications system on which the invention is implemented. Any suitable modulation, coding, interleaving, and signal format may be used.

When the incoming training sequence, as modified or degraded by effects of the over-the-air channel disturbances, arrives at the FPGA 18, the FPGA strips the incoming training sequence from the received packet and sends all of the bits comprising the training sequence to the digital signal processor (DSP) 20.

The digital signal processor (DSP) 20 provides the majority of the channel impulse response estimator functions. The DSP comprises a utility configured to construct a Toeplitz-type representation. Thus, the DSP receives the incoming training sequence from the FPGA and reformats the training sequence by forming an augmented matrix as will be described. Using the augmented matrix and a transform-based computation, the DSP forms the adjoint and then the Gramm matrix [S*S] as will be described.

The DSP also comprises a utility configured to replicate an original version of the training sequence as included in a packet prior to transmission via the communication channel.

Thus, the DSP also receives the TRANSEC sequence from the cryptographic subsystem and using that sequence, calculates the training sequence in the same manner as was previously done by the transmit-end receiver operating in its transmit mode. The DSP contains the same algorithm as used at the transmitter for calculating the training sequence and is thus able to construct a replica of the training sequence that was calculated by the transmitter and inserted into the outbound (transmitted) packet.

The DSP further comprises a utility configured to process the Toeplitz-type representation to determine coefficients representative of the channel impulse response of the channel. Using its replica of the transmitted training sequence, the DSP forms a $\phi$ matrix and, at this point, the DSP has constructed the matrix equation, $[S^*S]h=\phi$, to be further described. Since the Gramm matrix $[S^*S]$ and the matrix $\phi$ are known, the impulse response, h, is the unknown which will be determined pursuant to the invention. The unique manner by which the transmit sequence was assembled results in the Gramm matrix $[S^*S]$ being a Toeplitz matrix. The Levinson algorithm, in a form suitable for solving Toeplitz systems, is then executed by the DSP on this system. The resulting 1×128 matrix, h, contains the coefficients of the channel impulse response.

The DSP, in cooperation with the FIR filter, comprises a utility configured to use such coefficients to process data included in a packet. After calculating the channel impulse response, the DSP 20 sends the 128 real and 128 imaginary coefficients to the FPGA 18. The FPGA loads the real and imaginary coefficients into the 128-tap FIR filter's registers designated for that purpose, using known techniques. As the remainder of the packet is received, the received symbols are applied to the input of the FIR filter. As a result the FIR filter provides an output in the form of the received data with channel disturbance effects substantially compensated for and removed.

In this implementation, each packet contains a training sequence newly constructed for that packet and whenever a new packet is received, the estimation system calculates the channel impulse response anew. There is a small, but finite probability the PN code used to calculate a particular training sequence may result in formation of a singular Gramm matrix, that is, a matrix containing linearly-dependent columns, which will preclude formation of a Toeplitz system with the result that it will not be possible to independently determine the channel impulse response coefficients for use with a particular packet. If no means of detecting this condition were provided, the occurrence of such a singular Gramm matrix could be permitted to result in the provision of an incorrect channel impulse response estimation. To avoid that result, the program implementing the Levinson algorithm may be provided with a code to detect singular principal minors during the Levinson reduction (e.g., principal minors whose determinants are zero). This would detect linearly-dependent columns of the matrix. In such a case, the Levinson program may be arranged to set a flag indicating the singular case and to end processing for that particular training sequence. The singular flag may be arranged to be read by the FPGA, which would then provide an instruction not to replace the impulse response coefficients in the FIR filter for the current packet, but rather to retain the previous coefficients. Since analysis has indicated the rate of singularities can be expected to be sufficiently small, and there is a high data transmission rate inherent in the packets, it would be expected that under normal operating conditions the channel impulse response is not likely to vary significantly from one packet to the next. Thus, under these conditions the previous impulse response values may be retained until a packet arrives containing a non-singular training sequence. Further, in some less critical implementations satisfactory performance may be provided with a newly constructed training sequence provided for fewer than every packet transmitted (e.g., only for every other packet, thereby providing a fifty percent reduction in training sequence processing).

Figure 4:
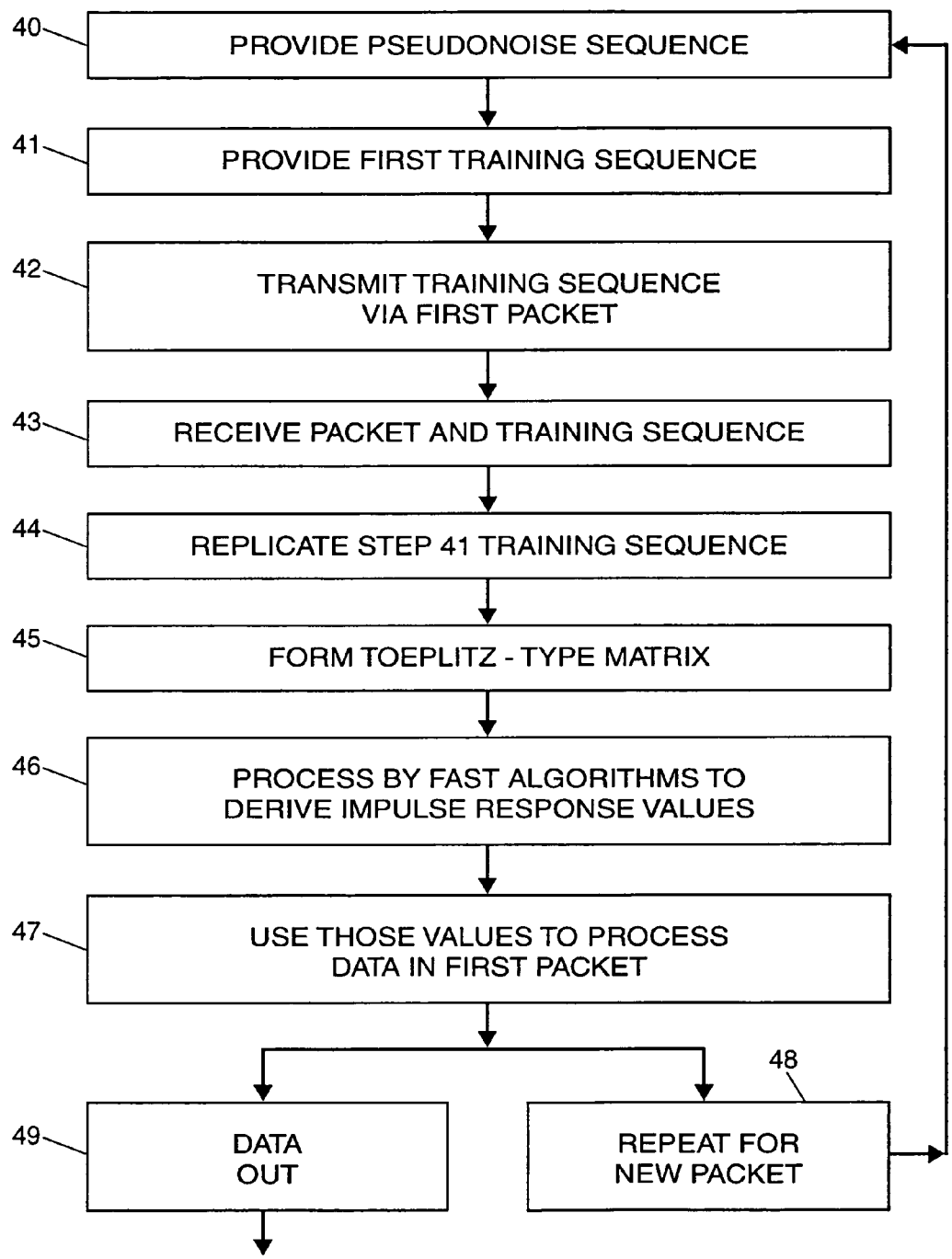
FIG. 4 is a flow chart useful in describing a method pursuant to the invention.

FIG. 4 is a flow chart useful in describing a method pursuant to the invention. As illustrated in FIG. 4, a method of channel impulse response estimation, usable with a digital wireless communication channel, may include the following.

At step 40, providing a first pseudonoise (PN) sequence for a first packet.

At step 41, with use of the first PN sequence, providing a first training sequence.

At step 42, transmitting the first training sequence via a communication channel via a first packet including first data.

At step 43, receiving the first packet and the first training sequence as transmitted via the communication channel.

At step 44, forming a replica of the first training sequence as provided at step 41.

At step 45, forming a Toeplitz-type representation by use of the replica of the first training sequence as provided in step (41) and use of the first training sequence as received in step (43).

At step 46, processing the Toeplitz-type representation to determine coefficients representative of the channel impulse response of the communication channel.

At step 47, using the coefficients in processing of the first data as included in the first packet. Thus, the coefficients may be applied to the taps of an adaptive equalizer filter used to process received data signals to correct effects of transmission distortions.

In FIG. 4, step 46 may more particularly comprise processing the Toeplitz-type representation by use of fast algorithms, such as fast Fourier and inverse Fourier transforms and Levinson-type algorithms.

Further steps to the method of FIG. 4 may include repeating steps 40 through 47 via step 48 with substitution of a second PN sequence, a second training sequence, a second packet and second data for the corresponding first elements (i.e., for "first pseudonoise (PN) sequence" substitute "second pseudonoise (PN) sequence", for "first packet" substitute "second packet", etc.). Output of user data is provided at step 49, as indicated in FIG. 4.

Implementations of this method may include fewer, additional or changed steps as may be appropriate for particular applications as determined by skilled persons.

Training Sequence and Impulse Response Estimation

The training sequence utilized for channel impulse response estimation pursuant to the invention comprises a pseudonoise (PN) sequence derived from an output provided by the cryptographic subsystem 24 or other suitable source of a PN sequence which is identifiable so as to permit replication of the training sequence derived from that PN sequence. This enables a PN sequence used to form a training sequence prior to transmission over a communication channel (e.g., the original version) to be replicated after such transmission in order to provide at the receiver a replica of the original version of the training sequence. The receiver is thus provided with both the original version of the training sequence (via such replication) and a received version which has been subjected to disturbances during transmission. Pursuant to the invention, the original and received versions of the training sequence are used for channel impulse response estimation.

To provide a complete and concise description of the impulse response implementation pursuant to the invention use is made of a published theoretical derivation (R. E. Blahut, *Fast Algorithms for Digital Signal Processing*, Addison Wesley, p. 352-355). This derivation is repeated here so as to introduce a self-contained implementation description. There are then addressed the steps appropriate to provide a Toeplitz mathematical system containing no direct matrix inversions and the solution of the Toeplitz system using a fast algorithm. The construction of a training sequence (i.e., a training sequence vector) is addressed first.

Let: s=Transmitted PN training sequence vector, which is known a priori at the transmitter.

r=Received response to the transmitted PN training sequence h=Unknown channel impulse response vector Additionally, Let: M be the length of the impulse response vector h, and:

L be the length of the training sequence s. (L is greater than 2M and ideally 8M as described below)

The PN training sequence s is generated from a pseudorandom ordering of the elements of the finite or Galois field of length 2. The training sequence is thus $s_k = j^k b_k$ where $b_k \in \{-1, 1\}$ and j is the imaginary operator $\sqrt{-1}$. Note that as a result of this formulation, $s_k$ consists of a PN sequence of alternating real and imaginary elements with random sign, e.g. $[-1, j, -1, j, -1, -j, 1, -j, -1, -j \ldots]$, etc.

Note that the response sample sequence contains a transient initial segment that depends on the random signal samples (assumed not known) that preceded the training signal. Assume h is of length M and that we utilize L (L>2M, with L preferably on the order of 8M) training samples to excite the channel.

Assume the received samples are numbered starting from 0 and therefore that $r_0$ is the first sample of the response to training. As mentioned above, it is necessary to skip the first M−1 samples of the sequence r in order to ensure that the measured data depends only on the known training signal (aside from the additive noise). In order to produce the desired matrix structures at various stages in the estimation algorithm it is sufficient to transmit the tail (M−1 chip) segment of the training sequence first.

The training sequence actually transmitted is therefore:

$$\{s_{L-(M-1)}, s_{L-(M-2)}, s_{L-(M-3)}, \ldots s_{L-1}, s_0, s_1, s_2, s_3, \ldots s_{L-1}\}.$$

This training sequence is in the form: {last M−1 samples of training sequence full training sequence of length L}, whence the actual transmitted training sequence is of length L+M−1.

From FIG. 2 above, it is seen that:

$$r = s * h \quad \text{(Where * indicates convolution of the two vectors)} \quad \text{Equation (1)}$$

Thus, starting with the $M^{th}$ sample we have, for k=0 ... L−1 and assuming $h_k$ is zero for k>M−1, $$r_{M-1+k} = \sum_{i=0}^{M-1} s_{<L+k-i>} h_i \quad \text{Equation (2)}$$

Where: the notation <n> denotes the positive integer n'=(n modulo L).

Expressing the indexed sequence convolution in matrix notation, we have:

$$\begin{bmatrix} r_{M-1} \\ r_M \\ r_{M+1} \\ \vdots \\ \vdots \\ r_{L+M-2} \end{bmatrix} = \begin{bmatrix} s_0 & s_{L-1} & \cdots & \cdots & \cdots & s_{L-(M-1)} \\ s_1 & s_0 & \cdots & \cdots & \cdots & s_{L(M-2)} \\ \vdots & \vdots & & & & \vdots \\ s_{M-1} & s_{M-2} & \cdots & \cdots & \cdots & s_0 \\ \vdots & \vdots & & & & \vdots \\ s_{L-1} & s_{L-2} & \cdots & \cdots & \cdots & s_{L-M} \end{bmatrix} \cdot \begin{bmatrix} h_0 \\ h_1 \\ h_2 \\ \vdots \\ \vdots \\ h_{M-1} \end{bmatrix} \quad \text{Equation (3)}$$

Notice that the L×M matrix S is column circulant by construction. From this it follows that the associated Gramm matrix, G=S*S, is Toeplitz, Hermitian and non-negative definite. Note that in the case of a real training sequence, the Gramm matrix is also symmetric, however, in the embodiment of this invention the training sequence will be complex and thus symmetry of the Gramm matrix is not guaranteed.

In order for G to be singular, and thus not usable for present purposes, it is necessary that the columns of S be linearly dependent. This is not an impossible result; however it is extremely improbable with use of high performance random sequence generators. For present purposes, a matrix is singular, that is, non-invertable, if the condition number is infinite, that is, if the smallest singular value or eigenvalue of the matrix is zero. In this case, the non-invertibility of the Gramm matrix means that the impulse response system cannot be solved for that particular matrix. As discussed above, in such a case the impulse response coefficients determined for a preceding packet may be reused. While there is a finite probability that a particular impulse response solution will be impossible to solve based upon the singularity of the Gramm matrix, this probability can be expected to be very small.

The least-square estimate of h from the received response to s (r) is obtained as $$\underline{h} = [S^*S]^{-1} \underline{\phi} = G^{-1} \underline{\phi}$$

where $$\underline{\phi} = S^* \underline{r} \quad \text{Equation (4)}$$

Explicitly, we have, for k=0 ... M−1, $$\phi_k = \sum_{j=0}^{L-1} s^*_{<L-k+j>} r_{j+M-1} \quad \text{Equation (5)}$$

Thus, it is necessary to compute $\phi = S^*r$. In this form there can be recognized a circular convolution, namely the circular convolution of the conjugated first column of S with the vector r, except that the indices j and k within the angle brackets in Equation 5 are of opposite sign to the sign that appears in a usual convolution. This last effect can be accommodated easily by taking appropriate conjugates in the transform-based (FFT) computation. Thus, let $$W = e^{-j2\pi L^{-1}} \quad \text{Equation (6)}$$

and consider the following transforms:

$$A_n = \sum_{k=0}^{L-1} s_k W^{kn} \quad \text{Equation (7)}$$

-continued $$B_n = \sum_{k=0}^{L-1} r_k W^{kn} \quad \text{Equation (8)}$$

$$C_n = A_n^* B_n \quad \text{Equation (9)}$$

$$\psi_k = \sum_{n=0}^{L-1} C_n W^{-kn} \quad \text{Equation (10)}$$

Substituting the expressions for $C_n$, $B_n$ and $A_n$, taking care of the conjugation of A, it is readily verified that $\psi_k = \phi_k$ for $k=0 \ldots M-1$. Thus, the mechanization defined below may be used to compute $\phi$.

Using the transforms represented in Equation (6) through Equation (10), above, the following mechanization can be identified:

1. Transmit the L=9M samples of the PN training sequence s through the channel to be estimated and collect the corresponding 9M samples of the received response r at the receiver. Discard the first M−1 samples of r as noted above, in order to discard those samples of r that precede the arrival of the first value of r actually resulting from the first training sequence sample.

2. Obtain the fast Fourier transform of the training sequence from sample 0 to sample L-1, indicated as FFT $[s_{(0 \ldots L-1)}]$. It is intended that this operation be performed using the FFT macros available in the universal transceiver modem's digital signal processor (DSP).

3. Generate the augmented vector, $r^{(a)}$, by padding the received response vector r with M−1 zero-value elements such that the augmented vector $r^{(a)}$ contains L resulting elements.

4. Obtain the fast Fourier transform of the augmented vector $r^{(a)}$ from sample 0 to sample L-1, indicated as FFT $[r^{(a)}_{(0 \ldots L-1)}]$. Again, it is intended that this operation be performed using the DSP's FFT macros.

5. Produce the product of the complex conjugate of FFT $[s_{(0 \ldots L-1)}]$ and FFT $[r^{(a)}_{(0 \ldots L-1)}]$, e.g. [FFT $[s_{(0 \ldots L-1)}]]^* \cdot$ FFT $[r^{(a)}_{(0 \ldots L-1)}]$ Note that this requires two matrix operations: inverting the signs of the imaginary parts of L elements of a 1×L vector s and multiplication of two 1×L vectors.

6. Obtain the inverse fast Fourier transform of the product of the complex conjugate of FFT $[s_{(0 \ldots L-1)}]$ and FFT $[r^{(a)}_{(0 \ldots L-1)}]$, e.g. IFFT $\{[$FFT $[s_{(0 \ldots L-1)}]]^* \cdot$ FFT $[r^{(a)}_{(0 \ldots L-1)}]\}$ Note that the inverse fast Fourier transform of Step (6) may be obtained utilizing the original FFT by taking the complex conjugate of the product [FFT $[s_{(0 \ldots L-1)}]]^* \cdot$ FFT $[r^{(a)}_{(0 \ldots L-1)}]$, performing an FFT on the complex conjugate of the product, and then taking the complex conjugate of the FFT output, e.g. $\{$FFT$[[[$FFT $[s_{(0 \ldots L-1)}]]^* \cdot$ FFT $[r^{(a)}_{(0 \ldots L-1)}]]^*]\}^*$ If performed in this manner this operation thus requires three matrix operations: Inverting the signs of L elements of the product vector, performing the FFT on the conjugate of the product, and inverting the signs of the imaginary parts of the FFT output elements. This mechanization may be more convenient for implementation since the same size FFT would be used for both the FFT and the inverse. Alternatively, the inverse fast Fourier transform may be performed upon [FFT $[s_{(0 \ldots L-1)}]]^* \cdot$ FFT $[r^{(a)}_{(0 \ldots L-1)}]$ directly. Extract the first M samples of this result, which comprise the vector $\phi$.

7. Form the adjoint, that is, the conjugate transpose of the matrix S illustrated above in Equation (3) as follows:

$$\begin{bmatrix} s_0 & s_{L-1} & \cdots & \cdots & \cdots & s_{L-(M-1)} \\ s_1 & s_0 & \cdots & \cdots & \cdots & s_{L-(M-2)} \\ \vdots & \vdots & & & & \vdots \\ s_{M-1} & s_{M-2} & \cdots & \cdots & \cdots & s_0 \\ \vdots & \vdots & & & & \vdots \\ s_{L-1} & s_{L-2} & \cdots & \cdots & \cdots & s_{L-M} \end{bmatrix} \rightarrow$$

$$\begin{bmatrix} s_0^* & s_1^* & \cdots & s_{M-1}^* & \cdots & s_{L-1}^* \\ s_{L-1}^* & s_0^* & \cdots & s_{M-2}^* & \cdots & s_{L-2}^* \\ \vdots & & & \vdots & & \vdots \\ \vdots & & s_{M-2}^* & \cdots & \cdots & s_0^* \\ \vdots & & & & & \vdots \\ s_{L-(M-1)}^* & s_{L-(M-2)}^* & \cdots & s_0^* & \cdots & s_{L-M}^* \end{bmatrix}$$

This step requires two matrix operations: transposing each row and column of S and inverting the sign of the imaginary part of each element in S.

8. Form the product of adjoint [S], as obtained in Step (7), and the original matrix S. This operation requires an M×M matrix multiplication. This product is the Gramm matrix, [S*S].

Note: The Gramm matrix computation can be simplified as follows:

a. Renumber the indices of the 9M samples of the transmit sequence: $\{s_{L-(M-1)}, s_{L-(M-2)}, s_{L-(M-3)}, \cdots s_{L-1}, s_0, s_1, s_2, s_3, \ldots s_{L-1}\}$, as follows: $\{s_0, s_1, s_2, \ldots, s_{1150}, s_{1151}\}$ b. Extract the following elements of the renumbered transmit sequence into the following subsequence, $\underline{s}_0$:

$\underline{s}_0 = \{s_0, s_{128}, s_{256}, s_{384}, s_{512}, s_{640}, s_{768}, s_{896}, s_{1024}\}$ c. Extract the following elements of the renumbered transmit sequence into the following 128 subsequences, $\underline{s}_1$ through $\underline{s}_{127}$:

$\underline{s}_1 = \{s_1, s_{129}, s_{257}, s_{385}, s_{513}, s_{641}, s_{769}, s_{897}, s_{1025}\}$ $\underline{s}_2 = \{s_2, s_{130}, s_{258}, s_{386}, s_{514}, s_{642}, s_{770}, s_{898}, s_{1026}\}$ $\vdots$ $\underline{s}_{126} = \{s_{126}, s_{254}, s_{382}, s_{510}, s_{638}, s_{766}, s_{894}, s_{898}, s_{1150}\}$ $\underline{s}_{127} = \{s_{127}, s_{255}, s_{382}, s_{511}, s_{639}, s_{767}, s_{895}, s_{1023}, s_{1151}\}$ d. Calculate the 128 elements of the first row of [S*S] by means of dot products as follows (Note that only the first row of [S*S] is required by the Levinson algorithm, since the Toeplitz, symmetric matrix is completely described by the first row as explained in Paragraph 3.1-7, below):

(1). Form the complex conjugate of $\underline{s}_0$, $$\underline{s}^*_0 = \{s^*_0, s^*_{128}, s^*_{256}, s^*_{384}, s^*_{512}, s^*_{640}, s^*_{768}, s^*_{896}, s^*_{1024}\}$$

i.e., Invert the sign of the imaginary component of each element of $S_0$.

2). Calculate each dot product as follows:

$$S^*_0 = s^*_0 \cdot s_0$$

$$S^*_1 = s^*_0 \cdot s_1$$

$$S^*_2 = s^*_0 \cdot s_2$$

$$\vdots$$

$$S^*_{126} = s^*_0 \cdot s_{126}$$

$$S^*_{127} = s^*_0 \cdot s_{127}$$

Note that each of these products are ordinary dot products as used to calculate the product of two vectors, e.g.:

$$S^*_0 = \underline{s}^*_0 \cdot$$
$$\underline{s}_1 = [(s^*_0 \cdot s_0) + (s^*_{128} \cdot s_{128}) + (s_{256} \cdot s_{256}) + (s^*_{384} \cdot s_{384}) + (s^*_{512} \cdot s_{512}) + (s^*_{640} \cdot s_{640}) + (s^*_{768} \cdot s_{768}) + (s^*_{896} \cdot s_{896}) + (s^*_{1024} \cdot s_{1024})]$$

The resulting 128 values, $S^*_0$ through $S^*_{128}$, constitute the first row of $[S^*S]$, and are used as the input to the Levinson algorithm below.

9. From Equation (4) above:

$$\underline{\tilde{h}} = [S^*S]^{-1}\underline{\phi} = G^{-1}\underline{\phi} \quad \text{Equation (11)}$$

Thus:

$$[S^*S]\underline{\tilde{h}} = \underline{\phi} \quad \text{Equation (12)}$$

10. Or, equivalently, expanded in matrix notation: Equation (13)

$$\begin{bmatrix} S^*_0 & S^*_1 & \cdots & S^*_{M-1} & S^*_{L-1} \\ S^*_{L-1} & S^*_0 & \cdots & S^*_{M-2} & S^*_{L-2} \\ \cdots & \cdots & \cdots & \cdots & \cdots \\ \cdots & S^*_{M-2} & \cdots & \cdots & S^*_0 \\ \cdots & \cdots & \cdots & \cdots & \cdots \\ S^*_{L-(M-1)} & S^*_{L-(M-2)} & \cdots & S^*_0 & S^*_{L-M} \end{bmatrix}$$

$$\begin{bmatrix} \tilde{h}_0 \\ \tilde{h}_1 \\ \vdots \\ \tilde{h}_{M-1} \end{bmatrix} = \begin{bmatrix} \phi_0 \\ \phi_1 \\ \vdots \\ \phi_{M-1} \end{bmatrix}$$

Note that this manipulation replaces the direct inversion of the product matrix $[S^*S]$ that would otherwise be required and substitutes a pseudo-inverse.

As previously noted the Gramm matrix $[S^*S]$ in the matrix equation of Step 9 is a Hermitian matrix. A Hermitian matrix is a symmetric matrix which is self-adjoint, that is, equal to its complex conjugate transpose. A Toeplitz matrix is one in which the elements along each descending 45° diagonal are equal.

More importantly, the matrix equation of Step 9 is also a Toeplitz matrix, thus the system of Step 10 is a Toeplitz system. A fast algorithm, the Levinson algorithm, will be applied to the solution of this system.

Levinson Mechanization

The mechanization of the Levinson algorithm is as follows:

Algorithm Notes

1. The coefficients of the running polynomials t(x) and h(x) should be stored as 1×k complex arrays. Each element of the array t and h is understood to represent the coefficient of that term of the polynomial, i.e.:

a. $t(x) = (t_0^{(r)}, t_1^{(r)}, t_2^{(r)}, t_3^{(r)}, \ldots, t_{r-k+1}^{(r)})$ b. $h(x) = (h_0^{(r)}, h_1^{(r)}, h_2^{(r)}, h_3^{(r)}, \ldots, h_{r-k+1}^{(r)})$ 2. All the operations done by this procedure are performed upon the coefficients. The argument x in t(x) and h(x) is thus a dummy variable.

3. In the array notation of the coefficients $t_r^{(r)}$ or $h_r^{(r)}$, the subscript r means the position of the coefficient within the array, or the order of the term, that is, $t_1$ means the coefficient of x ($t_1^{(r)}x$), $t_2$ means the coefficient of $x^2$ ($t_2^{(r)}x^2$), etc.

The superscript of the coefficient, (r), denotes the value of the coefficient during iteration r. In like manner, the superscript (r+1) denotes the next or updated value of the coefficient.

4. In each iteration of the procedure, the updated value of the highest-order coefficient $t_{r+1}^{(r+1)}$ t for the next iteration is calculated using $t_{r+1}^{(r+1)} = -\beta t_0^{(r)}$, where $t_0^{(r)}$ is the value of to calculated in the previous iteration.

5. The remaining values of $t_{r+1}^{(r+1)}$ are determined in the intervening steps of the procedure as shown.

6. $\alpha^{(r)}$, $\beta^{(r)}$, and $\gamma^{(r)}$ are scalars (that is, 1×1 "arrays"), determined by calculating the sum of products of the matrix elements $S_i$ and $t_{r-i}$ or $h_{r-i}$, respectively for the new values of $\beta^{(r)}$ and $\gamma^{(r)}$, and $\alpha^{(r)2} - \beta^{(r)2}$, for the new value of $\alpha^{(r+1)}$ as shown in the procedure.

7. It is not necessary to store the entire 128×128 Gramm matrix in the implementation of the Levinson algorithm. Since the Gramm matrix is Toeplitz and symmetric, it is completely specified by the first row, as each subsequent row is just a cyclically-shifted version of the previous row. The Levinson solution operates upon the first 128 elements, that is, the first row, of the Gramm matrix only. The code implementing the algorithm need assemble and store only the first row of $[S^*S]$ and the $\phi$ vector, each consisting of 128 elements. This is a key simplification of the implementation by reducing the equations to one-dimensional arrays.

8. The size of the Gramm matrix is determined by the length of the channel impulse response vector, in this case 128. The $[S]$ matrix used to compute $[S^*S]$ is of dimension L×M, where L is the training sequence length and M is the length of the impulse response vector (128). L, the training sequence length, is 9M, thus the dimension of $[S]$ is 128×(9*128) or 128×1152. The conjugate transpose of $[S]$, $[S^*]$, has dimension M×L, or 1152× 128. The Gramm matrix $[S^*S]$ is the product of $[S^*]$ and $[S]$, that is, it is the product of a 128×1152 and a 1152× 128 matrix. The resulting Gramm matrix dimension is therefore 128×128.

Note that the length of the training sequence, L (in this case 1152), does not affect the dimensions of the Gramm matrix.

Levinson Algorithm Procedure

Enter the procedure with the matrix [S*S] and the $\phi$ vector as illustrated in Equation (13), above:

Start-Initialize:

$r \leftarrow 0$    (1)

$h(x) \leftarrow \dfrac{\phi_0}{S_0^*}$    (2)

$t_0(x) \leftarrow 1$    (3)

$\alpha \leftarrow S_0^*$    (4)

Continue:

$r \leftarrow r + 1$ $\beta = \sum_{i=0}^{r-1} S_i^* t_{r-1-i}$ $\gamma = \sum_{i=0}^{r-1} S_i^* h_{r-1-i}$ $t_0^{(r)} = \alpha t_0^{(r-1)}$ $t_1^{(r)} = \alpha t_1^{(r-1)} - \beta t_{r-1}^{(r-1)}$ $t_2^{(r)} = \alpha t_2^{(r-1)} - \beta t_{r-2}^{(r-1)}$ $t_3^{(r)} = \alpha t_3^{(r-1)} - \beta t_{r-3}^{(r-1)}$ $\vdots$ $t_k^{(r)} = \alpha t_k^{(r-1)} - \beta t_{r-k}^{(r-1)}$ $t_r^{(r)} = -\beta t_0^{(r)}$ $t = (t_0^{(r)}, t_1^{(r)}, t_2^{(r)}, t_3^{(r)}, \ldots, t_{r-k+1}^{(r)})$ $t' = (t_{r-k+1}^{(r)}, \ldots, t_3^{(r)}, t_2^{(r)}, t_1^{(r)}, t_0^{(r)})$ $t'' = \dfrac{\phi_r - \gamma}{\alpha^2 - \beta^2} t'$ $h = t'' + t'$    (5)

$\alpha \leftarrow \alpha^2 - \beta^2$

If r=r−k+1, STOP.

Else, CONTINUE.

It is noted that in the WNW high rate equalizer channel estimation, k is 128.

Completion of the procedure yields the complex-valued 1×k vector h, consisting of the elements $h_0$ through $h_{M-1}$, which are the complex-valued coefficients of the channel impulse response. These coefficients are then loaded into the equalizer's adaptive filter by the DSP into the field programmable gate array (FPGA), which implements the equalizer. The coefficients are retained until the next channel estimation, which occurs at the beginning of the next Wideband Networking Waveform packet.

As this procedure illustrates, the algorithm requires M iterations of two inner summations, each inner summation being iterated from 1 to M times for each of M outer iterations. For an impulse response length of 128, for example, this algorithm has a complexity of $N^2=128^2$ or 16,384. A traditional solution using matrix inversion would have a complexity of $N^3=128^3$ or 2,097,152.

The theory and derivation of the Levinson algorithm may be found in Reference 2 or other texts on fast algorithms.

Example of Levinson Algorithm Mechanization

An example illustrating the above procedure for the first three iterations is as follows:

Start:

$r = 0$ $h_0^{(0)} = \dfrac{\phi_0}{S_0^*}$ $t_0^{(0)} = 1$ $\alpha = S_0^*$

Continue:

$r = 1$ $\beta = S_1^* t_0 = S_1^* * 1 = S_1^*$ $\gamma = S_1^* t_0 = S_1^* * \dfrac{\phi_0}{S_0^*} = S_1^* \dfrac{\phi_0}{S_0^*}$ $t_0^{(1)} = \alpha t_0^{(0)} = \alpha * 1 = S_0^*$ $t_1^{(1)} = -\beta t_0^{(0)} = -\beta * 1 = -S_1^*$ $t = (t_0^{(1)}, t_1^{(1)}) = (S_0^*, -S_1^*)$ $t' = (t_1^{(1)}, t_0^{(1)}) = (-S_1^*, S_0^*)$ -continued $$t'' = \frac{\phi_0 - \gamma}{\alpha^2 - \beta^2} t' = \frac{\phi_0 - S_0^* \frac{\phi_0}{S_0^*}}{S_0^{*2} - S_1^{*2}}(-S_1^*, S_0^*) = \left(\frac{\phi_0 - S_1^* \frac{\phi_0}{S_0^*}}{S_0^{*2} - S_1^{*2}}(-S_1^*), \frac{\phi_0 - S_1^* \frac{\phi_0}{S_0^*}}{S_0^{*2} - S_1^{*2}}(S_0^*)\right)$$

$$h = t'' + t = \left(\frac{\phi_0 - S_1^* \frac{\phi_0}{S_0^*}}{S_0^{*2} - S_1^{*2}}(-S_1^*), \frac{\phi_0 - S_1^* \frac{\phi_0}{S_0^*}}{S_0^{*2} - S_1^{*2}}(S_0^*)\right) + (S_0^*, S_1^*) =$$

$$\left(\frac{\left(\phi_0 - S_1^* \frac{\phi_0}{S_0^*}\right)(-S_1^*)}{S_0^{*2} - S_1^{*2}} + S_0^*, \frac{\left(\phi_0 - S_1^* \frac{\phi_0}{S_0^*}\right)(S_0^*)}{S_0^{*2} - S_1^{*2}} + S_1^*\right) = (h_0^{(1)}, h_1^{(1)})$$

$\alpha \leftarrow \alpha^2 - \beta^2 = S_0^{*2} - S_1^{*2}$ $r = 2$ $\beta = S_1^* t_1^{(1)} + S_2^* t_0^{(1)} = S_1^* * -S_1^* + S_2^* * S_0^* = -S_1^{*2} + S_2^* S_0^*$ $$\gamma = S_1^* h_1^{(1)} + S_2^* h_0^{(1)} = S_1^* \left(\frac{\left(\phi_0 - S_1^* \frac{\phi_0}{S_0^*}\right)}{S_0^{*2} - S_1^{*2}} + S_1^*\right) + S_2^* \left(\frac{\left(\phi_0 - S_1^* \frac{\phi_0}{S_0^*}\right)(S_1^*)}{S_0^{*2} - S_1^{*2}} + S_0^*\right)$$

$t_0^{(2)} = \alpha t_0^{(1)} = (S_0^{*2} - S_1^{*2}) S_0^{*2}$ $t_1^{(2)} = \alpha t_1^{(1)} - \beta t_1^{(1)} = (S_0^{*2} - S_1^{*2})(-S_1^*) - (-S_1^{*2} + S_2^* S_0^*)(-S_1^*)$ $t_2^{(2)} = -\beta t_0^{(1)} = (-S_1^{*2} + S_2^* S_0^*) S_0^*$ $t =$ $(t_0^{(2)} t_1^{(2)} t_2^{(2)}) = ((S_0^{*2} - S_1^{*2})S_0^*, (S_0^{*2} - S_1^{*2})(-S_1^*) - (-S_1^{*2} + S_2^* S_0^*)(-S_1^*), (S_1^{*2} + S_2^* S_0^*)S_0^*)$ $t' = (t_2^{(2)} t_1^{(2)} t_0^{(2)}) =$ $((S_1^{*2} + S_2^* S_0^*)S_0^*, (S_0^{*2} - S_1^{*2})(-S_1^*) - (-S_1^{*2} + S_2^* S_0^*)(-S_1^*), (S_0^{*2} - S_1^{*2})S_0^*)$ $t'' = \frac{\phi_1 - \gamma}{\alpha^2 - \beta^2} t' = \frac{\phi_1 - \gamma}{\alpha^2 - \beta^2}(t_2^{(2)}, t_1^{(2)}, t_0^{(2)})$ $h = t'' + t = \left(\frac{\phi_1 - \gamma}{\alpha^2 - \beta^2} t_2^{(2)}, \frac{\phi_1 - \gamma}{\alpha^2 - \beta^2} t_1^{(2)}, \frac{\phi_1 - \gamma}{\alpha^2 - \beta^2} t_0^{(2)}\right) + (t_0^{(2)}, t_1^{(2)}, t_2^{(2)}) =$ $\left(\frac{\phi_1 - \gamma}{\alpha^2 - \beta^2} t_2^{(2)} + t_0^{(2)}, \frac{\phi_1 - \gamma}{\alpha^2 - \beta^2} t_1^{(2)} + t_1^{(2)}, \frac{\phi_1 - \gamma}{\alpha^2 - \beta^2} t_0^{(2)} + t_2^{(2)}\right) = (h_0^{(2)}, h_1^{(2)}, h_2^{(2)})$ $\alpha \leftarrow \alpha^2 - \beta^2$ $r = 3$ $\beta = S_0^* t_3^{(2)} + S_1^* t_2^{(2)} + S_2^* t_1^{(2)} + S_3^* t_0^{(2)} (\text{Note}: t_3^{(2)} = 0)$ $\gamma = S_0^* h_3^{(2)} + S_1^* h_2^{(2)} + S_1^* h_1^{(2)} + S_3^* h_0^{(2)} (\text{Note}: h_3^{(2)} = 0)$ $t_0^{(3)} = \alpha^{(3)} t_0^{(2)}$ $t_1^{(3)} = \alpha^{(3)} t_1^{(2)} - \beta^{(3)} t_2^{(2)}$ $t_2^{(3)} = \alpha^{(3)} t_2^{(2)} - \beta^{(3)} t_1^{(2)}$ $t_3^{(3)} = -\beta^{(3)} t_0^{(2)}$ $t = (t_0^{(3)}, t_1^{(3)}, t_2^{(3)}, t_3^{(3)})$ $t' = (t_3^{(3)}, t_2^{(3)}, t_1^{(3)}, t_0^{(3)})$ $t'' = \frac{\phi_2 - \gamma}{\alpha^2 - \beta^2} t' = \frac{\phi_2 - \gamma}{\alpha^2 - \beta^2}(t_3^{(3)}, t_2^{(3)}, t_1^{(3)}, t_0^{(3)})$ $h = t'' + t = \left(\frac{\phi_2 - \gamma}{\alpha^2 - \beta^2} t_3^{(3)}, \frac{\phi_2 - \gamma}{\alpha^2 - \beta^2} t_2^{(3)}, \frac{\phi_2 - \gamma}{\alpha^2 - \beta^2} t_1^{(3)}, \frac{\phi_2 - \gamma}{\alpha^2 - \beta^2} t_0^{(3)}\right) +$ $(t_0^{(3)}, t_1^{(3)}, t_2^{(3)}, t_3^{(3)}) =$ $\left(\frac{\phi_2 - \gamma}{\alpha^2 - \beta^2} t_3^{(3)} + t_0^{(3)}, \frac{\phi_2 - \gamma}{\alpha^2 - \beta^2} t_2^{(3)} + t_1^{(3)}, \frac{\phi_2 - \gamma}{\alpha^2 - \beta^2} t_1^{(3)} + t_2^{(3)}, \frac{\phi_2 - \gamma}{\alpha^2 - \beta^2} t_0^{(3)} + t_3^{(3)}\right) =$ $(h_0^{(3)}, h_1^{(3)}, h_2^{(3)}, h_3^{(3)})$ $\alpha \leftarrow \alpha^2 - \beta^2$ The theory and derivation of the Levinson algorithm may be found in texts on fast algorithms (see, for example, R. E. Blahut, *Fast Algorithms for Digital Signal Processing*, Addison Wesley, p. 352-355).

The method as described utilizes the pseudo-inverse inherent in the Gramm matrix equation $[S^*S]\bar{h}=\phi$ which provides a minimum mean-square error or lowest-energy solution of the channel impulse response. The impulse response estimation mechanization as described assumes a priori that the Gramm matrix $G=[S^*S]$ as provided is in fact invertable. As discussed above, it is possible that certain training sequences generated from the SDU keystream will give rise to a Gramm matrix that is noninvertible. Since the mechanization of the impulse response estimation does not determine the invertability of the Gramm matrix prior to performing the Levinson algorithm, analysis was performed to determine the maximum number of noninvertible cases likely to occur. In those instances where the Gramm matrixis noninvertible, the impulse response calculated will be incorrect. If the number of incorrect estimations due to a noninvertible Gramm matrix is sufficiently small, performance of the described method will not be significantly affected. The invertability of the Gramm matrix is characterized by its condition number, that is, the ratio of the largest to the smallest eigenvalue (or singular value in the singular value decomposition) of the Gramm matrix. An infinite condition number indicates that the matrix is not invertible. Simulation carried out to evaluate the rate of occurrence of this condition supports the conclusion that the number of resulting incorrect estimations will not in practice be material. As discussed above, implementation of a flag during processing can be employed to provide for reuse of preceding accurate estimation values in order to avoid use of incorrect estimations.

While there have been described certain currently preferred embodiments of the invention, those skilled in the art will recognize that other and further modifications may be made without departing from the invention and it is intended to claim all modifications and variations as fall within the scope of the invention.

What is claimed is:

1. A method of channel impulse response estimation, usable with a digital wireless communication channel, comprising the steps of:
   (a) providing a first pseudonoise (PN) sequence for a first packet;
   (b) with use of said first PN sequence, providing a first training sequence;
   (c) transmitting said first training sequence via said communication channel via a first packet including first data;
   (d) receiving said first packet and said first training sequence as transmitted via said communication channel;
   (e) forming a Toeplitz-type representation comprising an invertable Gramm matrix, by use of a replica of said first training sequence as provided in step (b) and use of said first training sequence as received in step (d);
   (f) processing said Toeplitz-type representation to determine coefficients representative of the channel impulse response of said communication channel; and
   (g) using said coefficients in processing of said first data as included in the first packet.

2. A method as in claim 1, wherein step (b) comprises:
   (b) providing a first training sequence usable in forming a Toeplitz-type matrix system.

3. A method as in claim 1, wherein step (b) comprises:
   (b) providing a first training sequence comprising a PN sequence of alternating real and imaginary elements having substantially random polarity.

4. A method as in claim 1, wherein step (b) comprises:
   (b) providing a first training sequence $s_k=j^k b_k$ where $b_k \in \{-1,1\}$ and j is the imaginary operator $\sqrt{-1}$.

5. A method as in claim 1, additionally comprising between steps (d) and (e) the step of:
   (x) forming a replica of said first training sequence as provided in step (b).

6. A method as in claim 1, wherein step (f) comprises:
   (f) processing said Toeplitz-type representation by use of fast algorithms.

7. A method as in claim 1, wherein step (f) comprises:
   (f) processing said Toeplitz-type representation by use of at least one fast Fourier transform.

8. A method as in claim 1, wherein step (f) comprises:
   (f) processing said Toeplitz-type representation by use of a Levinson-type algorithm.

9. A method as in claim 1, wherein step (g) comprises:
   (g) using said coefficients by application to an adaptive equalizer filter.

10. A method as in claim 1, comprising the further step of:
    (h) repeating steps (a) through (g) with substitution of a second PN sequence, a second packet, a second training sequence and second data for the corresponding first elements of claim 1, respectively.

11. A method of channel impulse response estimation, usable with a digital wireless communication channel, comprising the steps of:
    (a) receiving a first packet, including first data and a first training sequence assembled with use of a first pseudonoise (PN) sequence, as transmitted via said communication channel;
    (b) forming a Toeplitz-type representation comprising an invertable Gramm matrix, by use of a replica of said first training sequence as transmitted and use of said first training sequence as received in step (a);
    (c) processing said Toeplitz-type representation to determine coefficients representative of the channel impulse response of said communication channel; and
    (d) using said coefficients in processing of said first data as included in the first packet.

12. A method as in claim 11, additionally comprising between steps (a) and (b) the step of:
    (x) forming a replica of said first training sequence as transmitted prior to being received in step (a).

13. A method as in claim 11, wherein step (c) comprises:
    (c) processing said Toeplitz-type representation by use of fast algorithms.

14. A method as in claim 11, wherein step (c) comprises:
    (c) processing said Toeplitz-type representation by use of at least one fast Fourier transform.

15. A method as in claim 11, wherein step (c) comprises:
    (c) processing said Toeplitz-type representation by use of a Levinson-type algorithm.

16. A method as in claim 11, wherein step (d) comprises:
    (d) using said coefficients by application to an adaptive equalizer filter.

17. A channel impulse response estimation system, usable with a digital wireless communication channel, comprising:
    a utility configured to receive a first packet transmitted via said communication channel and provide a received version of a first training sequence associated with said first packet;

a utility configured to replicate an original version of said first training sequence as associated with said first packet prior to transmission via said communication channel;

a utility configured to construct a Toeplitz-type representation of the channel impulse response, comprising a digital signal processor responsive to said received and original versions of the first training sequence and arranged to construct a Toeplitz-type representation comprising an invertable Gramm matrix;

a utility configured to process said Toeplitz-type representation to determine coefficients representative of the channel impulse response of said communication channel; and a utility configured to use said coefficients to process data included in said first packet.

18. A system as in claim 17, wherein said utility configured to replicate comprises:

a digital signal processor responsive to a received cryptographic signal associated with said first packet and arranged to replicate said first training sequence as provided for transmission via said first packet.

19. A system as in claim 17, wherein said utility configured to process comprises:

a digital signal processor responsive to said Toeplitz-type representation and arranged to determine coefficients representative of the channel impulse response by use of at least one fast algorithm.

20. A system as in claim 19, wherein said digital signal processor is arranged to determine said coefficients by use of at least one fast Fourier transform.

21. A system as in claim 19, wherein said digital signal processor is arranged to determine said coefficients by use of at least one Levinson-type algorithm.

22. A system as in claim 17, further comprising:

a cryptographic subsystem coupled to said utility configured to replicate and arranged to provide a pseudonoise (PN) sequence replicating a PN sequence used in constructing said original version of said first training sequence.

23. A method of channel impulse response estimation, usable with a digital wireless communication channel, comprising the steps of:

(a) receiving a first packet, including first data and a first training sequence assembled with use of a first pseudonoise (PN) sequence, as transmitted via said communication channel;

(b) forming a Toeplitz-type representation by use of a replica of said first training sequence as transmitted and use of said first training sequence as received in step (a);

(c) processing said Toeplitz-type representation by use of a Levinson-type algorithm, to determine coefficients representative of the channel impulse response of said communication channel; and (d) using said coefficients in processing of said first data as included in the first packet.

24. A method as in claim 23, additionally comprising between steps (a) and (b) the step of:

(x) forming a replica of said first training sequence as transmitted prior to being received in step (a).

25. A method as in claim 23, wherein step (b) comprises:

(b) forming a Toeplitz-type representation comprising an invertable Gramm matrix.

26. A method as in claim 23, wherein step (c) comprises:

(c) processing said Toeplitz-type representation by use of fast algorithms.

27. A method as in claim 23, wherein step (c) comprises:

(c) processing said Toeplitz-type representation by use of at least one fast Fourier transform.

28. A method as in claim 23, wherein step (d) comprises:

(d) using said coefficients by application to an adaptive equalizer filter.

29. A channel impulse response estimation system, usable with a digital wireless communication channel, comprising:

a utility configured to receive a first packet transmitted via said communication channel and provide a received version of a first training sequence associated with said first packet;

a utility configured to replicate an original version of said first training sequence as associated with said first packet prior to transmission via said communication channel;

a utility configured to construct a Toeplitz-type representation by use of said received and original versions of the first training sequence;

a utility configured to process said Toeplitz-type representation, comprising a digital signal processor responsive to said Toeplitz-type representation and arranged to determine coefficients representative of the channel impulse response of said communication channel by use of at least one fast algorithm comprising a Levinson-type algorithm; and a utility configured to use said coefficients to process data included in said first packet.

30. A system as in claim 29, wherein said utility configured to replicate comprises:

a digital signal processor responsive to a received cryptographic signal associated with said first packet and arranged to replicate said first training sequence as provided for transmission via said first packet.

31. A system as in claim 29, wherein said utility configured to construct comprises:

a digital signal processor responsive to said received and original versions of the first training sequence and arranged to construct a Toeplitz-type representation of the channel impulse response.

32. A system as in claim 31, wherein said digital signal processor is arranged to construct a Toeplitz-type representation comprising an invertable Gramm matrix.

* * * * *